United States Patent
Corston-Oliver (10) Patent No.: US 6,430,552 B1
(45) Date of Patent: *Aug. 6, 2002

(54) METHOD FOR CONVERTING QUERIES WITH LOGICAL OPERATORS INTO FREE TEXT QUERIES

(75) Inventor: Simon H. Corston-Oliver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,496

(22) Filed: Dec. 24, 1998

(51) Int. Cl.[7] ............................................... G06F 17/30
(52) U.S. Cl. ................... 707/3; 707/2; 709/203
(58) Field of Search ............................. 707/2, 3, 4, 10, 707/500, 529; 709/203, 200, 252

(56) References Cited

U.S. PATENT DOCUMENTS

| | | | |
|---|---|---|---|
| 5,845,278 A | * 12/1998 | Kirsch et al. | 707/3 |
| 5,859,972 A | * 1/1999 | Subramaniam et al. | 709/203 |
| 5,873,081 A | * 2/1999 | Harel | 707/3 |
| 5,983,216 A | * 11/1999 | Kirsch et al. | 707/2 |
| 6,018,733 A | * 1/2000 | Kirsch et al. | 707/3 |

* cited by examiner

*Primary Examiner*—Thomas Black
*Assistant Examiner*—Susan Chen
(74) *Attorney, Agent, or Firm*—Theodore M. Magee; Westman, Champlin & Kelly, P.A.

(57) ABSTRACT

A method is implemented in a computerized system that provides access to a search tool capable of searching at least one stored record. The method includes determining whether a search query is a logical query by comparing each search term to a set of logical operators. If a search term is in the set of logical operators it is removed from the search query to produce a modified search query. The modified search query is then passed to a search engine.

17 Claims, 6 Drawing Sheets

METHOD FOR CONVERTING QUERIES WITH LOGICAL OPERATORS INTO FREE TEXT QUERIES

BACKGROUND OF THE INVENTION

The present invention relates to tools for performing computerized searches of data. In particular, the present invention relates to tools for structuring search queries.

One of the most popular uses for computerized systems is the storage and retrieval of large amounts of data. To retrieve data, especially text based data, users either search through an index of the data to locate the data they desire or submit searching parameters to a computerized searching tool that searches through the data based on the parameters.

To improve the precision of the search results returned by search tools, many search tools accept logical operators that define the relationships between various terms of a search query. These logical operators typically include boolean operators such as AND, OR, and NOT. The logical operators can also include pseudo Boolean operators such as NEAR, WITHIN (often delineated as W/), and parentheses.

When used properly with a search tool that is designed to accept them, such logical operators can improve searching efficiency. Unfortunately, the use of logical operators is not intuitive, and many searchers use them incorrectly. This results in poorly formed logical expressions that can actually diminish the performance of a search tool. For example, if the user places a logical operator next to a preposition such as "to", a search tool may not find a match for the complete expression because search tools generally do not index prepositions.

An additional problem with using logical operators is that not every search tool expects to receive logical operators in a query. For example, natural language search tools expect search queries to be entered as normal sentences or questions. The insertion of logical operators in an otherwise normal sentence simply impedes the performance of such search tools.

SUMMARY OF THE INVENTION

A method is implemented in a computerized system that provides access to a search tool capable of searching at least one stored record. The method includes determining whether a search query is a logical query by comparing each search term to a set of logical operators. If a search term is in the set of logical operators it is removed from the search query to produce a modified search query. The modified search query is then passed to a search engine.

In some embodiments, the method determines that the query is a logical query if logical operators appear as every other word in the search query. In other embodiments, capitalized logical operators indicate that this is a logical search query.

DETAILED DESCRIPTION OF ILLUSTRATIVE EMBODIMENTS

Figure 1:
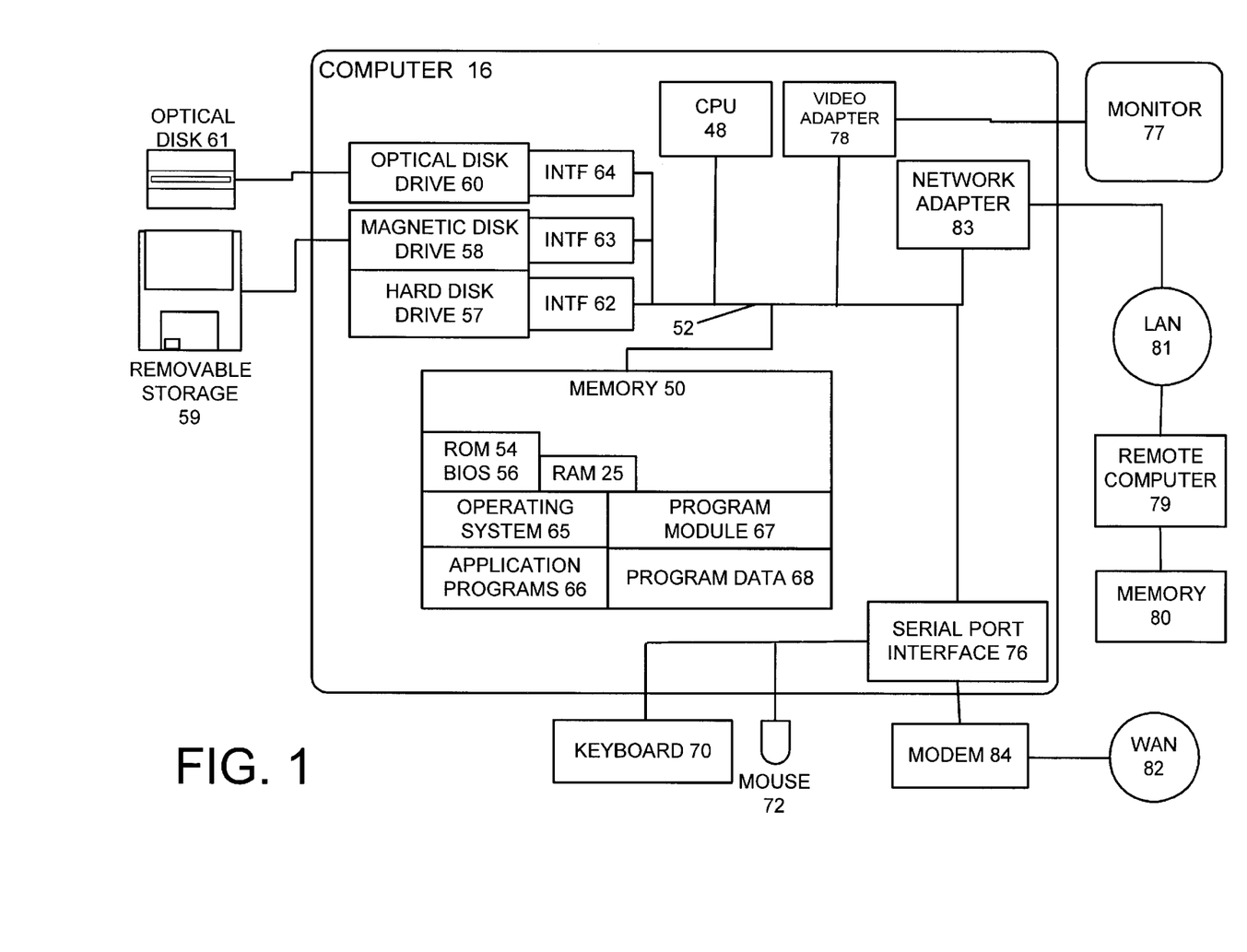
FIG. 1 is a plan view of a computerized environment for the present invention.

FIG. 1 and the related discussion are intended to provide a brief, general description of a suitable desktop computer 16 in which portions of the invention may be implemented. Although not required, the invention will be described, at least in part, in the general context of computer-executable instructions, such as program modules, being executed by a personal computer 16 a wireless push server 20 or mobile device 18. Generally, program modules include routine programs, objects, components, data structures, etc. that perform particular tasks or implement particular abstract data types. Moreover, those skilled in the art will appreciate that desktop computer 16 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing desktop computer 16 includes a general purpose computing device in the form of a conventional personal computer 16, including processing unit 48, a system memory 50, and a system bus 52 that couples various system components including the system memory 50 to the processing unit 48. The system bus 52 may be any of several types of bus structures including a memory bus or memory controller, a peripheral bus, and a local bus using any of a variety of bus architectures. The system memory 50 includes read only memory (ROM) 54, and a random access memory (RAM) 55. A basic input/output system (BIOS) 56, containing the basic routine that helps to transfer information between elements within the desktop computer 16, such as during start-up, is stored in ROM 54.

The desktop computer 16 further includes a hard disc drive 57 for reading from and writing to a hard disc (not shown), a magnetic disk drive 58 for reading from or writing to removable magnetic disc 59, and an optical disk drive 60 for reading from or writing to a removable optical disk 61 such as a CD ROM or other optical media. The hard disk drive 57, magnetic disk drive 58, and optical disk drive 60 are connected to the system bus 52 by a hard disk drive interface 62, magnetic disk drive interface 63, and an optical drive interface 64, respectively. The drives and the associated computer readable media provide nonvolatile storage of computer readable instructions, data structures, program modules and other data for the desktop computer 16. Although the exemplary environment described herein employs a hard disk, a removable magnetic disk 59, and a removable optical disk 61, it should be appreciated by those skilled in the art that other types of computer readable media that can store data and that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, magnetic disk 59, optical disk 61, ROM 54 or RAM 55, including an operating system 65, one or more application programs 66 (which may include PIMs), other program modules 67 (which may include synchronization component 26), and program data 68.

A user may enter commands and information into desktop computer 16 through input devices such as a keyboard 70, pointing device 72 and microphone 74. Other input devices (not shown) may include a joystick, game pad, satellite dish, scanner, or the like. These and other input devices are often connected to processing unit 48 through a serial port interface 76 that is coupled to the system bus 52, but may be connected by other interfaces, such as a sound card, a parallel port, game port or a universal serial bus (USB). A monitor 77 or other type of display device is also connected to the system bus 52 via an interface, such as a video adapter 78. In addition to the monitor 77, desktop computers may typically include other peripheral output devices such as speakers or printers.

Desktop computer 16 may operate in a networked environment using logic connections to one or more remote computers (other than mobile device 18), such as a remote computer 79. The remote computer 79 may be another personal computer, a server, a router, a network PC, a peer device or other network node, and typically includes many or all of the elements described above relative to desktop computer 16, although only a memory storage device 80 has been illustrated in FIG. 1. The logic connections depicted in FIG. 1 include a local area network (LAN) 81 and a wide area network (WAN) 82. Such networking environments are commonplace in offices, enterprise-wide computer network intranets and the Internet.

When used in a LAN networking environment, desktop computer 16 is connected to the local area network 81 through a network interface or adapter 83. When used in a WAN networking environment, desktop computer 16 typically includes a modem 84 or other means for establishing communications over the wide area network 82, such as the Internet. The modem 84, which may be internal or external, is connected to the system bus 52 via the serial port interface 76. In a network environment, program modules depicted may be stored in the remote memory storage devices. It will be appreciated that the network connections shown are exemplary and other means of establishing a communications link between the computers may be used.

Desktop computer 16 runs operating system 65, which is typically stored in non-volatile memory 54 and executes on processor 48. One suitable operating system is a Windows brand operating system sold by Microsoft Corporation, such as Windows 95, Windows 98 or Windows NT, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y.

Application programs are preferably stored in program module 67, in volatile memory or non-volatile memory, or can be loaded into any of the components shown in FIG. 1 from disc drive 59, CDROM drive 61, downloaded from a network via network adapter 83, or loaded using another suitable mechanism.

A dynamically linked library (DLL), comprising a plurality of executable functions is associated with PIMs in the memory for execution by processor 48. Interprocessor and intercomponent calls are facilitated using the component object model (COM) as is common in programs written for Microsoft Windows brand operating systems. Briefly, when using COM, a software component such as DLL has a number of interfaces. Each interface exposes a plurality of methods, which can be called individually to utilize different services offered by the software component. In addition, interfaces are provided such that methods or functions can be called from other software components, which optionally receive and return one or more parameter arguments.

The inventor of the present invention has recognized that some Internet search queries include poorly formed logical phrases that impede the performance of some search tools. He has also recognized that some search tools, such as natural language search engines, work better if there are no logical operators in the search query.

To address these problems, the present invention provides a method for identifying logical search queries and removing obstructive logical operators from those queries. Identifying logical queries involves more than simply locating a logical operator in a query because many logical operators appear in normal sentences and questions. For example, the search query "I want to see pages about laying tile and soldering pipes." is not a logical query even though it includes the logical operator "and". Removing "and" from this sentence would make the sentence unintelligible and could diminish the performance of the search tool, especially if the search tool is a natural language search tool.

Under the present invention, obstructive logical operators in a search query are identified based on systems and methods described below. The obstructive logical operators are then removed from the search query and the remainder of the search is submitted to a search engine.

Figure 2:
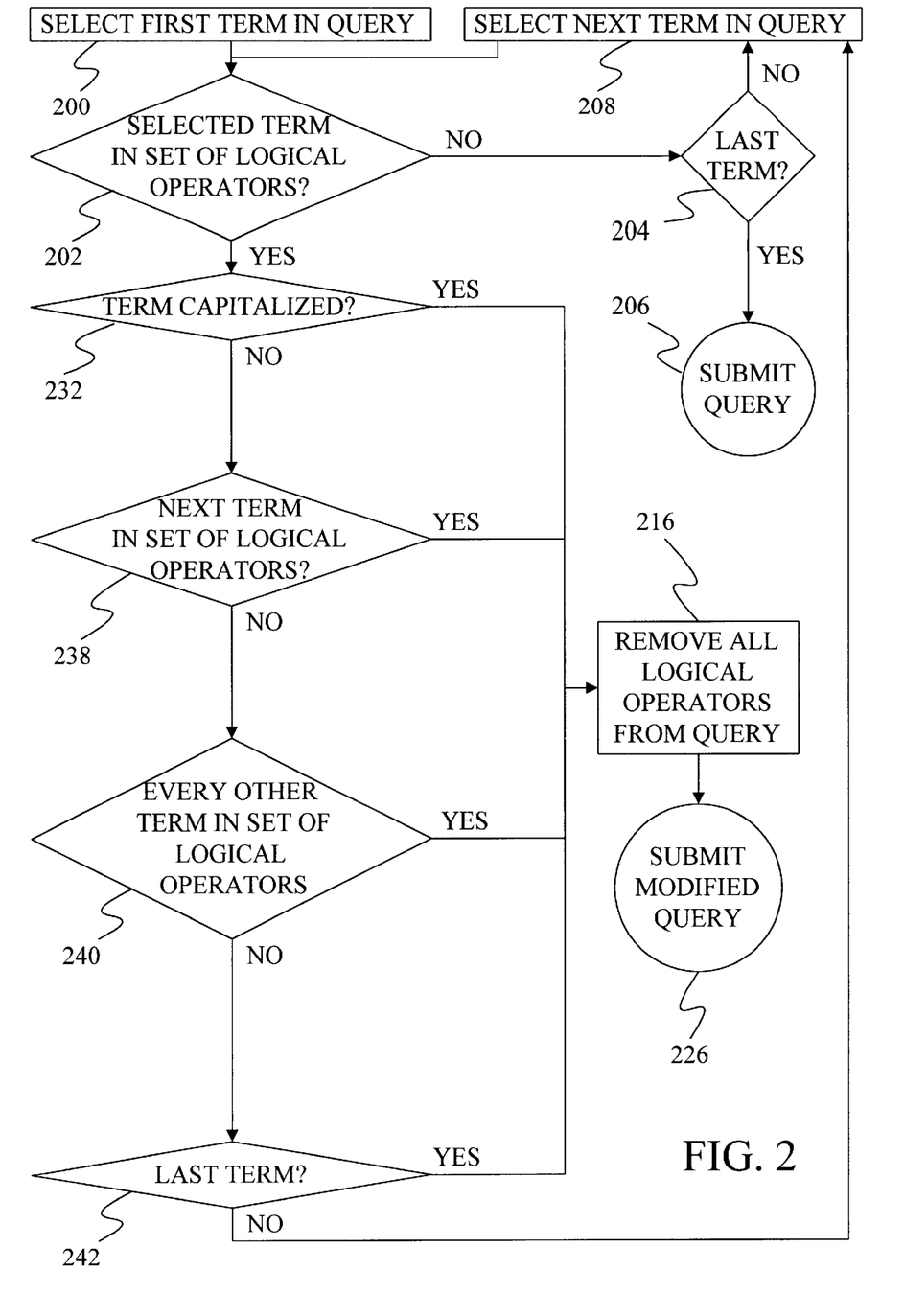
FIG. 2 is a flow diagram of a method of identifying and removing obstructive logical operators from a query.

FIG. 2 is a flow diagram of a method under the present invention for identifying and removing obstructive logical operators in a search query. The method begins at step 200 where the first term in the search query is selected. The process continues at step 202 where the selected term is compared to a set of logical operators to determine if the term is within the set. In some embodiments of the invention, the set of logical operators includes the Boolean operators "AND", "OR", "NOT", and "NEAR". If the selected term is not in the set of logical operators at step 202, the process continues at step 204 where the system determines if this is the last term in the search query. If this is not the last term in step 204, the process continues at step 208 where the next term in the query is selected. The process then returns to step 202.

If at step 202, the selected search query term is in the set of logical operators, the process continues at step 232 where the term is examined to determine if it is capitalized. Under the present invention, the inventor has recognized that users tend to capitalize terms such as "AND" and "OR" when they intend to use the terms as logical operators. Thus, if the term is capitalized and is found in the set of logical operators, the invention identifies the query as a logical query at step 232. Because the query is a logical query, the process continues at step 216 where every search term that is found in the set of logical operators is removed from the query. The modified query is then submitted to the search tool at step 226.

If the current term is not capitalized at step 232, the process continues at step 238 where the next term in the search query is examined to determine if it is a logical operator. If the next term is a logical operator, the user has placed two logical operators next to each other creating a faulty logical search query. When this occurs, all of the logical operators in the search query are removed at step 216.

If the next term in the search query is not in the set of logical operators in step 238, the method continues at step 240 where every other term (i.e. alternating terms) in the search query are examined to determine if the terms are in the set of logical operators. The present inventor has determined that if every other term in the search query is in the set of logical operators the search is likely to be a logical query. For example, a query such as "Dogs and hunting and for and pheasant" has a logical operator for every other term and is a logical query. Therefore, if every other term is a logical operator at step 240, all of the logical operators in the search query are removed at step 216.

If every other term in the search query is not in the set of logical operators at step 240, the process continues at step 242 where the search query is examined to determine if this is the last term in the search query. If this is the last term in the search query, the user has ended their search query with a logical operator. Since this has no logical meaning, it indicates that the user has produced a poorly formed logical search query. As such, all of the logical operators are stripped out of the search query at step 216. If this is not the last term in the search query, the process returns to step 208, where the next term in the search query is selected.

Those skilled in the art will recognize that not all of the criteria used in FIG. 2 to remove logical operators from the search query need to be included in the embodiments of the present invention. Any one of the criteria or any combination of the criteria found in FIG. 2 can be used with embodiments of the present invention. Furthermore, those skilled in the art will recognize that not all of the logical operators need to be removed if one of the criteria is met. Instead, in some embodiments of the present invention only those logical operators that directly meet a particular criterion are removed.

Figure 3:
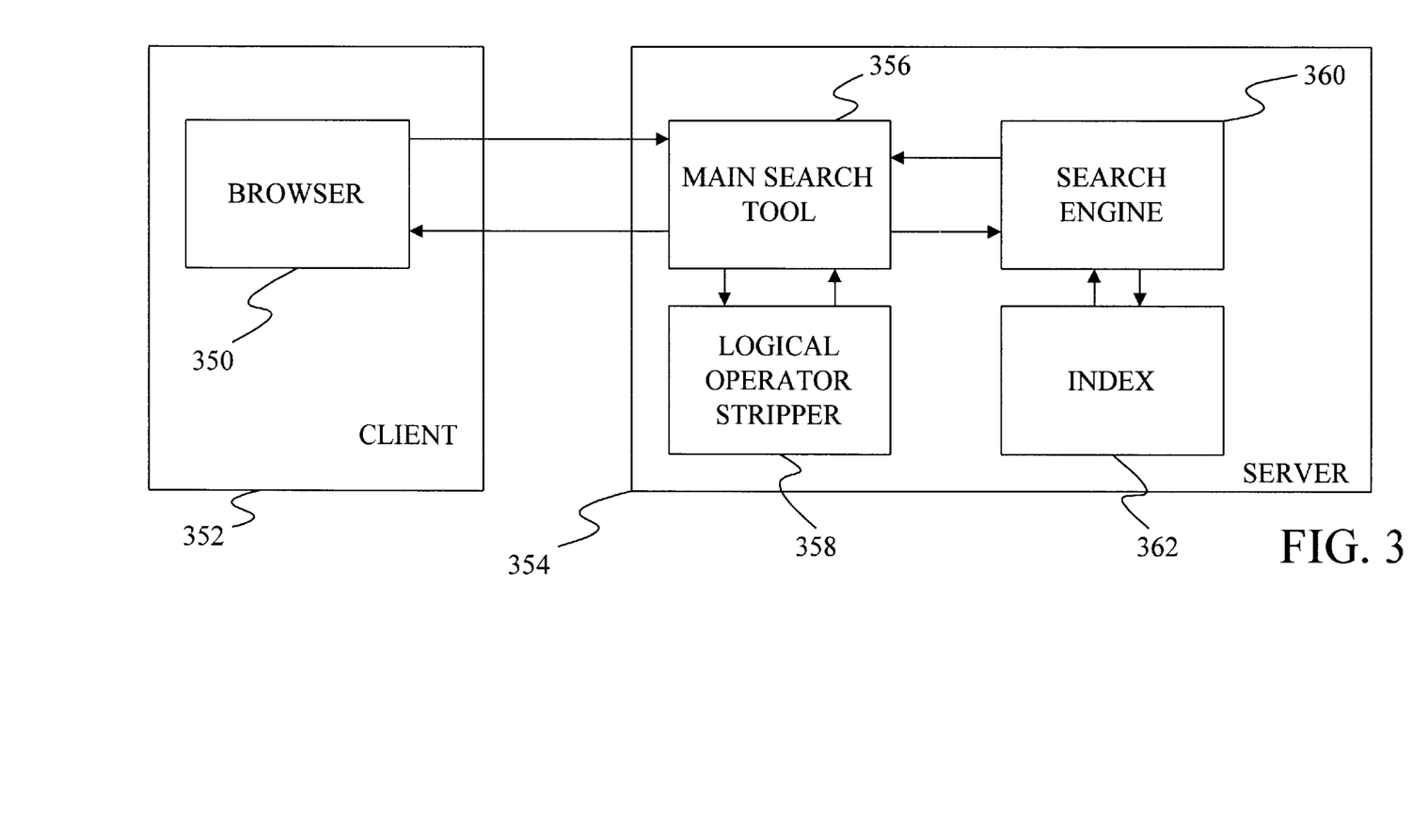
FIG. 3 is a block diagram of one embodiment of the present invention.

FIG. 3 is a block diagram of an embodiment of the present invention that is used as part of a search tool on a remote server. The elements of FIG. 3 are described below in connection with a flow diagram found in FIG. 4, which describes the process for submitting and processing a search on the remote server. The process of FIG. 4 begins at step 300 where a browser 350 is opened on a client 352. Client 352 can include a computer such as the one described in FIG. 1. Browser 350 can include any number of browsers available in the market including Internet Explorer 4 by Microsoft Corporation. At step 302, browser 350 retrieves a direct search interface from a search server 354 using known network protocols. The direct search interface is displayed by browser 350 and includes text and graphics designed to elicit a search query from the user. The search interface is considered direct because it is specific to a search engine 360 located on the search server.

Figure 4:
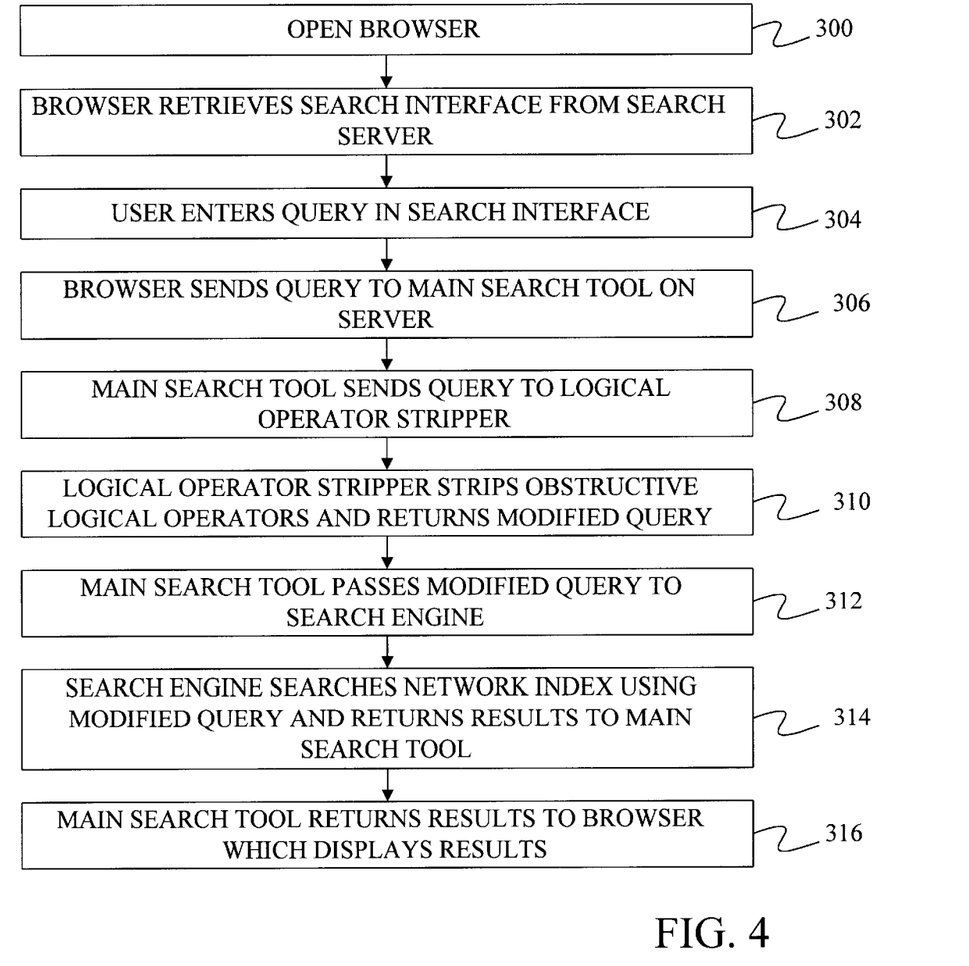
FIG. 4 is a flow diagram of a method of the present invention associated with FIG. 3.

At step 304 the user enters a search query in an appropriate text box of the search interface. Based on instructions found in the search interface, browser 350 sends the search query to a main search tool 356 on the search server 354 at a step 306.

Main search tool 356 passes the search query to a logical operator stripper 358 at step 308. Logical operator stripper 358 performs the functions described in the flow diagram of FIG. 2 and returns the modified query at step 310. At step 312, main search tool 356 passes the modified query returned by logical operator stripper 358 to search engine 360, which searches an index 362 using the modified search query.

Search engine 360 can include a free text search engine such as a natural language search engine, which processes the search query by identifying the linguistic relationship between the various words in the search query. Based on the linguistic relationships of the terms found in the search query, the natural language search engine is able to identify terms that should appear next to each other in a document in order for the document to be relevant to the search query. For example, a natural language search engine can identify noun phrases in a search query that should appear together in all relevant documents.

Search engine 360 may alternatively include a statistical search engine that returns matches for the search query based on the statistical significance of a term in the query appearing in a document on the network. Under such search engines, matches to words that are found throughout index 362 are weighted less significantly than matches to words that are rare in index 362.

In a further alternate embodiment, search engine 360 includes a simple matching algorithm that returns all indexed pages that have terms that match the search terms.

Based on its search of the index at step 314, search engine 360 returns the location of pages that match the modified query. After the search results are returned to main search tool 356 at step 314, main search tool 356 passes the results to browser 350 on client 352. Browser 350 then displays the results at step 316 of FIG. 4.

Figure 5:
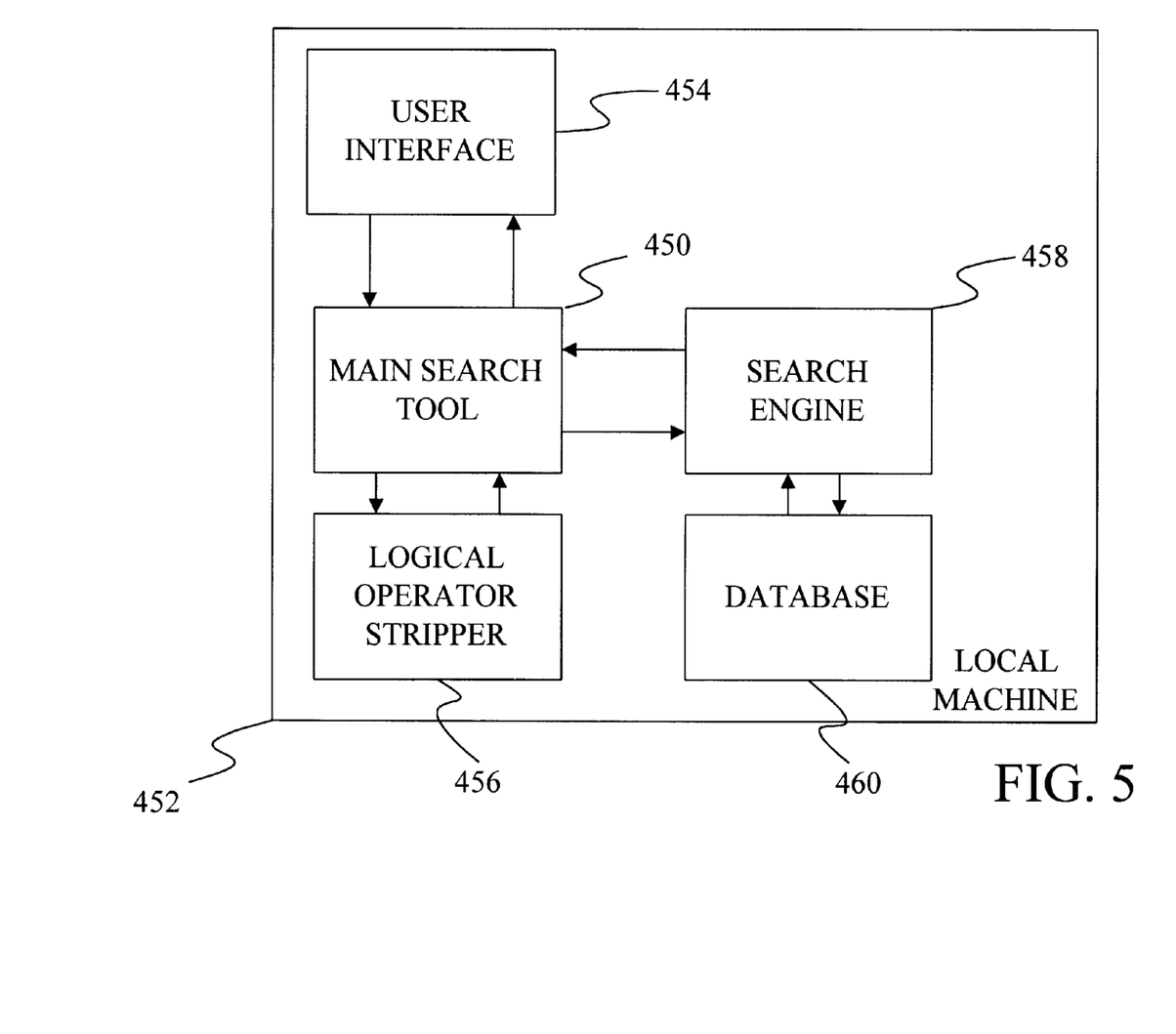
FIG. 5 is a block diagram of another embodiment of the present invention.
Figure 6:
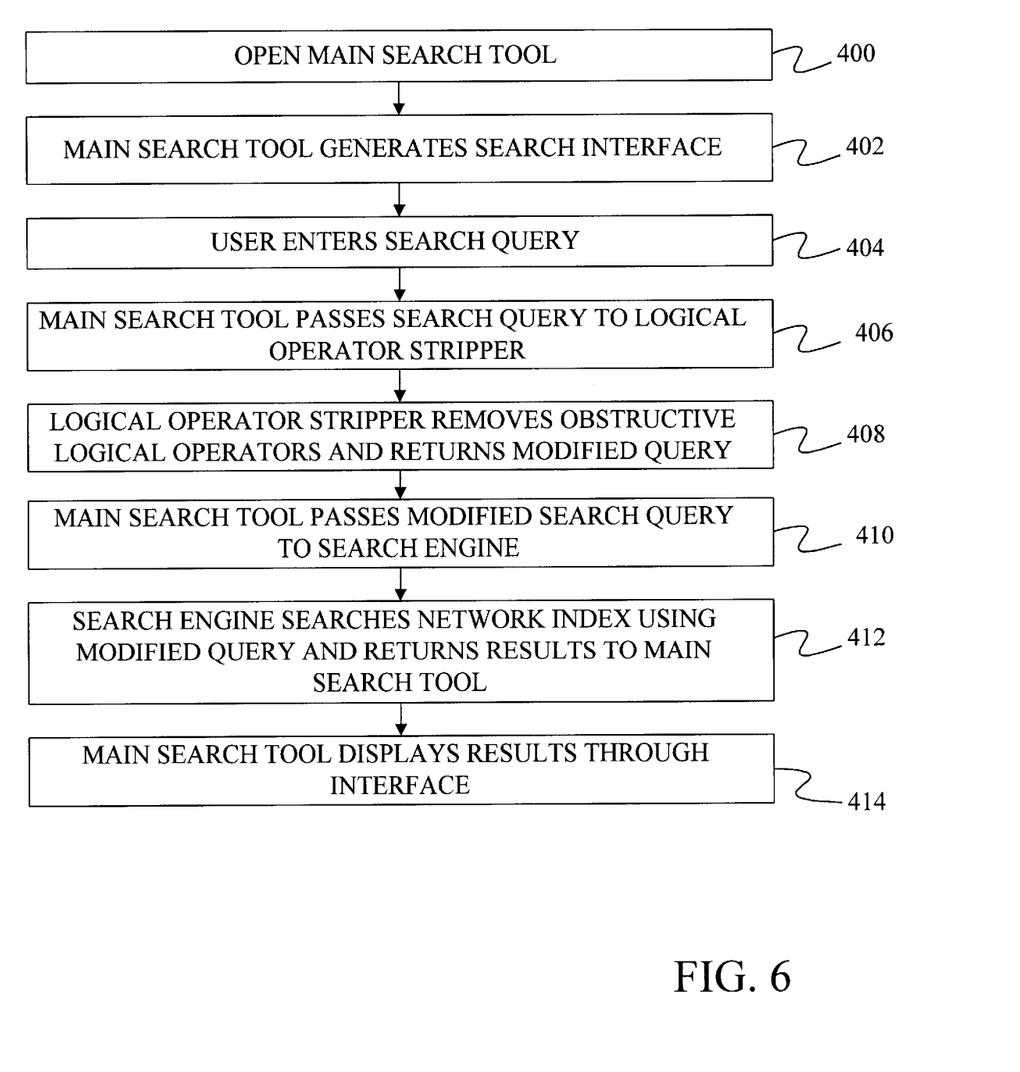
FIG. 6 is a flow diagram of a method of the present invention associated with FIG. 5.

FIG. 5 is a block diagram of another embodiment of the present invention, which has its operation described by the flow diagram of FIG. 6. Initially, at a step 400, the user opens the main search tool 450 on a local machine 452. Main search tool 450 then generates an indirect search interface 454 at a step 402. Indirect search interface 454 is produced on a display of local machine 452 and provides one or more areas in which the user may enter the text of their search query. This is shown as step 404 of FIG. 6. Search interface 454 is considered indirect because it is not dedicated to any one search engine but allows searching of many different search engines.

Once the user has entered their search, the search interface 454 passes the search to main search tool 450, which passes the search query to a logical operator stripper 456 at step 406. At step 408, the logical operator stripper 456 removes any obstructive logical operators using the process described in FIG. 2. The logical operator stripper 456 then returns a modified query at step 408. At step 410, main search tool 450 passes the modified search query to search engine 458.

Search engine 458 can include any one of the search engines described above for search engine 360 and in particular can include a natural language processing search engine and a statistical search engine. In addition, search engine 458 can be located on a local machine as shown in FIG. 5 or may be located on a remote server connected to the local machine. For example, search engine 458 may be located on an Internet server.

Search engine 458 searches a database 460, which can be located on one or more of the storage mediums of the local machine or spread across several machines in a networked environment. The search engine then returns search results at step 412 to main search tool 450. Main search tool 450 then displays the results through interface 454 at step 414.

Although the present invention has been described with reference to specific embodiments, workers skilled in the art will recognize that changes may be made in form and detail without departing from the spirit and scope of the invention.

What is claimed is:

1. A method in a computerized system providing access to a search engine capable of searching at least one stored record, the method comprising:

receiving a search query having search terms;

determining whether the search query is a logical query based on logical operators in the search query;

removing a search term if it is in a set of logical operators and the search query is determined to be a logical query, the process of removing the search term producing a modified search query; and passing the modified search query to a search engine.

2. The method of claim 1 wherein determining whether the search query is a logical query comprises determining whether a logical operator in the search query is capitalized.

3. The method of claim 1 wherein determining whether the search query is a logical query comprises determining whether a logical operator is at the end of the search query.

4. The method of claim 1 wherein determining whether the search query is a logical query comprises determining whether alternating terms in the search query are each logical operators.

5. The method of claim 1 wherein the logical operators comprise Boolean operators.

6. The method of claim 1 wherein receiving the search query comprises displaying a search solicitation interface to the user to elicit a search from the user.

7. The method of claim 6 wherein the search solicitation interface is a direct user interface for the search engine.

8. The method of claim 6 wherein the search solicitation interface is an indirect user interface for the search engine.

9. The method of claim 1 wherein the search engine is a free text search engine.

10. The method of claim 9 wherein the search engine is a natural language search engine.

11. The method of claim 1 wherein the search engine is a statistical search engine.

12. A computer program capable of providing a concrete tangible result through the steps of:

identifying logical operators in a user's search query;

determining whether a logical operator is an obstructive logical operator based on terms in the search query;

removing obstructive logical operators from the search query to produce a modified search query; and providing the modified search query to a search engine.

13. The computer program of claim 12 wherein determining whether a logical operator is an obstructive logical operator comprises determining if every other word in the search query is a logical operator.

14. The computer program of claim 12 wherein determining whether a logical operator is an obstructive logical operator comprises determining if two logical operators are next to each other.

15. The computer program of claim 12 wherein determining whether a logical operator is an obstructive logical operator comprises determining if a logical operator is capitalized.

16. The computer program of claim 12 wherein determining whether a logical operator is an obstructive logical operator comprises determining if a logical operator appears at the end of the search query.

17. A computer-readable medium having computer-executable instructions for performing steps comprising:

screening a search query to locate logical operators;

determining if a logical operator is an obstructive logical operator based on aspects of the search query;

removing the obstructive logical operators from the search query to produce a modified query; and passing the modified query so that it reaches a search tool capable of searching a data set based on the modified query.

* * * * *

UNITED STATES PATENT AND TRADEMARK OFFICE
CERTIFICATE OF CORRECTION

PATENT NO. : 6,430,552 B1
DATED : August 6, 2002
INVENTOR(S) : Corston-Oliver

It is certified that error appears in the above-identified patent and that said Letters Patent is hereby corrected as shown below:

<u>Column 7, line 33-Column 8, line 22,</u>
Replace as follows:

12. A computer-readable medium having computer-executable instructions for performing steps of:
    identifying logical operators in a user's search query;
    determining whether a logical operator is an obstructive logical operator based on terms in the search query;
    removing obstructive logical operators from the search query to produce a modified search query; and
    providing the modified search query to a search engine.

13. The computer-readable medium of claim 12 wherein determining whether a logical operator is an obstructive logical operator comprises determining if every other word in the search query is a logical operator.

14. The computer-readable medium of claim 12 wherein determining whether a logical operator is an obstructive logical operator comprises determining if two logical operators are next to each other.

UNITED STATES PATENT AND TRADEMARK OFFICE
CERTIFICATE OF CORRECTION

PATENT NO. : 6,430,552 B1
DATED : August 6, 2002
INVENTOR(S) : Corston-Oliver

It is certified that error appears in the above-identified patent and that said Letters Patent is hereby corrected as shown below:

```
15.     The computer-readable medium of claim 12
wherein determining whether a logical operator is an
obstructive logical operator comprises determining if
a logical operator is capitalized.

16.     The computer-readable medium of claim 12
wherein determining whether a logical operator is an
obstructive logical operator comprises determining if
a logical operator appears at the end of the search
query.
```

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,430,552 B1
DATED        : August 6, 2002
INVENTOR(S)  : Simon H. Corston-Oliver It is certified that error appears in the above-identified patent and that said Letters Patent is hereby corrected as shown below:

The Certificate of Correction issued March 18, 2003, should be vacated since no Certificate of Correction was granted.

Signed and Sealed this

Seventeenth Day of February, 2004

JON W. DUDAS
*Acting Director of the United States Patent and Trademark Office*